(12) United States Patent
Krishnaswamy et al.

(10) Patent No.: US 9,107,232 B2
(45) Date of Patent: Aug. 11, 2015

(54) INTERFERENCE MANAGEMENT BETWEEN MULTIPLE NETWORKS

(75) Inventors: Dilip Krishnaswamy, San Diego, CA (US); Amol Rajkotia, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 12/965,124

(22) Filed: Dec. 10, 2010

(65) Prior Publication Data

US 2012/0149414 A1    Jun. 14, 2012

(51) Int. Cl.
*H04B 7/00* (2006.01)
*H04W 72/12* (2009.01)
*H04W 16/14* (2009.01)

(52) U.S. Cl.
CPC .......... *H04W 72/1215* (2013.01); *H04W 16/14* (2013.01)

(58) Field of Classification Search
CPC ... H04W 16/14; H04W 72/082; H04W 72/04; H04W 36/06; H04W 24/00; H04W 28/16; H04W 52/244; H04W 72/00; H04W 72/0426; H04W 72/048; H04W 16/10; H04W 72/0486; H04W 72/10; H04W 88/06; H04B 1/1027; H04L 1/0026; H04L 25/0204
USPC .......... 455/509, 553.1, 63.1, 452.2, 454, 450, 455/63.2, 63.3, 435.2, 524, 443, 444, 446, 455/448, 449; 370/329, 252, 330, 336, 235, 370/310, 310.2, 341, 348
See application file for complete search history.

(56) References Cited

U.S. PATENT DOCUMENTS

| | | | |
|---|---|---|---|
| 8,023,898 B2* | 9/2011 | Abedi | 455/63.1 |
| 8,140,018 B2* | 3/2012 | Abedi | 455/63.1 |
| 8,401,478 B2 | 3/2013 | Kwak et al. | |
| 8,576,817 B2* | 11/2013 | Stanforth et al. | 370/338 |
| 2010/0085950 A1 | 4/2010 | Sekiya et al. | |
| 2010/0142495 A1 | 6/2010 | Li et al. | |

(Continued)

FOREIGN PATENT DOCUMENTS

| | | |
|---|---|---|
| EP | 2051551 A2 | 4/2009 |
| JP | 2006508616 A | 3/2006 |

(Continued)

OTHER PUBLICATIONS

International Search Report and Written Opinion—PCT/US2011/064002—ISA/EPO—Mar. 12, 2012.

*Primary Examiner* — Sujatha Sharma
(74) *Attorney, Agent, or Firm* — Jeffrey D. Jacobs

(57) ABSTRACT

Methods and apparatuses for interference management between multiple wireless networks are disclosed. The apparatuses, and methods for doing the same, communicate with one or more wireless devices in each of first and second wireless networks, the first and second wireless networks having a common spectrum and different air interface protocols, and generate a message for transmission into the first wireless network to suppress transmission in the first network and to reserve a medium for wireless transmissions in the second wireless network.

92 Claims, 7 Drawing Sheets

(56) References Cited

U.S. PATENT DOCUMENTS

| | | |
|---|---|---|
| 2010/0202391 A1* | 8/2010 | Palanki et al. ............... 370/329 |
| 2010/0226358 A1* | 9/2010 | Cordeiro ....................... 370/350 |
| 2010/0273471 A1 | 10/2010 | Meshkati et al. |
| 2011/0013578 A1 | 1/2011 | Shimizu et al. |
| 2012/0040715 A1* | 2/2012 | Fu et al. ...................... 455/553.1 |
| 2012/0315942 A1* | 12/2012 | Lin et al. ....................... 455/509 |
| 2012/0320882 A1* | 12/2012 | Sankar et al. ................ 370/336 |
| 2012/0327869 A1* | 12/2012 | Wang et al. ................... 370/329 |
| 2013/0003590 A1* | 1/2013 | Gage et al. .................... 370/252 |
| 2013/0064218 A1* | 3/2013 | Sundaresan et al. .......... 370/330 |

FOREIGN PATENT DOCUMENTS

| | | |
|---|---|---|
| JP | 2008508832 A | 3/2008 |
| JP | 2010056753 A | 3/2010 |
| JP | 2010093489 A | 4/2010 |
| JP | 2011514108 A | 4/2011 |
| WO | WO-2004051933 A2 | 6/2004 |
| WO | WO-2006019237 A1 | 2/2006 |
| WO | WO-2009113623 A1 | 9/2009 |
| WO | WO 2009114583 A2 | 9/2009 |
| WO | WO2010117998 A2 | 10/2010 |
| WO | WO-2010124246 A2 | 10/2010 |

\* cited by examiner

INTERFERENCE MANAGEMENT BETWEEN MULTIPLE NETWORKS

BACKGROUND

1. Field

This disclosure relates generally to wireless communications and more specifically, to interference management between multiple networks.

2. Introduction

Recently, there has been a tremendous growth in the deployment of short range wireless networks. The networks may be used, for example, as a consumer electronic wire replacement system for short range or indoor applications. These networks are sometimes referred to as Wireless Personal Area Networks (WPAN) and are useful for transferring video, audio, text, and other media between wireless devices. Typically, a WPAN uses some technology that permits short-range, high-bandwidth communications at very low energy levels. One such example is Ultra-Wideband (UWB), which is a technology for transmitting information spread over a large bandwidth (i.e., greater than 500 MHz). Under the right conditions, UWB technology is able to share the same spectrum with other users. Other examples of WPAN are Bluetooth and Wireless Local Area Network (WLAN).

Apart from WPAN technologies, there are Wireless Wide Area Networks (WWAN) such as, by way of example, Global System for Mobile Communications (GSM), Universal Mobile Telecommunications System (UMTS), Long Term Evolution (LTE) and Code Division Multiple Access (CDMA) networks. WWAN can support long range communication between a mobile device and another mobile or fixed device via a base station. With the advent of new technologies, WWAN are being increasingly used for various data applications in addition to voice. One key difference with WPAN is that WWAN operate in licensed spectrum while WPAN operate in unlicensed spectrum.

Despite advancements in radio technology, interference is becoming more of a concern as these networks become more prevalent and begin working in closer proximity to one another. Accordingly, there is a need in the art for cooperation between wireless networks operating in close proximity and sharing the same spectrum.

SUMMARY

In one aspect of the disclosure, an apparatus for wireless communications includes a processing system configured to support communications with one or more wireless devices in each of first and second wireless networks, the first and second wireless networks having a common spectrum and different air interface protocols, and generate a message for transmission into the first wireless network to suppress transmission in the first network and to reserve a medium for wireless transmissions in the second wireless network.

In another aspect of the disclosure, an apparatus for wireless communications including means for supporting communications with one or more wireless devices in each of first and second networks, the first and second wireless networks having a common spectrum and different air interface protocols, and means for generating a message for transmission into the first wireless network to suppress transmission in the first network and to reserve a medium for wireless transmissions in the second wireless network.

In yet another aspect of the disclosure, a method for wireless communications includes supporting communications with one or more wireless devices in each of first and second networks, the first and second wireless networks having a common spectrum and different air interface protocols, and generating a message for transmission into the first wireless network to suppress transmission in the first network and to reserve a medium for wireless transmissions in the second wireless network.

In a further aspect of the disclosure, a computer product includes a computer-readable medium including code for causing a computer to support communications with one or more wireless devices in each of first and second networks, the first and second wireless networks having a common spectrum and different air interface protocols, and code for causing a computer to generate a message for transmission into the first wireless network to suppress transmission in the first network and to reserve a medium for wireless transmissions in the second wireless network.

BRIEF DESCRIPTION OF THE DRAWINGS

Various aspects of apparatuses and methods, and the environments in which they operate, in will now be presented in the detailed description that follows, and in the accompanying drawings, wherein.

DETAILED DESCRIPTION

Various aspects of apparatuses and methods, and the environments, in which they operate, will be described below. The apparatuses and methods, however, may be embodied in many different forms and should not be construed as limited to the various configurations presented throughout this disclosure. Rather, the various aspects of these apparatuses and methods are provided so that this disclosure will be thorough and complete, and will fully convey the scope of the present invention to those skilled in the art. As those skilled in the art will readily appreciate, various details may be presented for the purpose of providing a thorough understanding of the apparatuses and methods, however, various configurations of these apparatuses and steps of the methods may be implemented without these specific details. In some instances, well-known structures and components are shown in block diagram form in order to avoid obscuring the various concepts presented throughout this disclosure.

Figure 1:
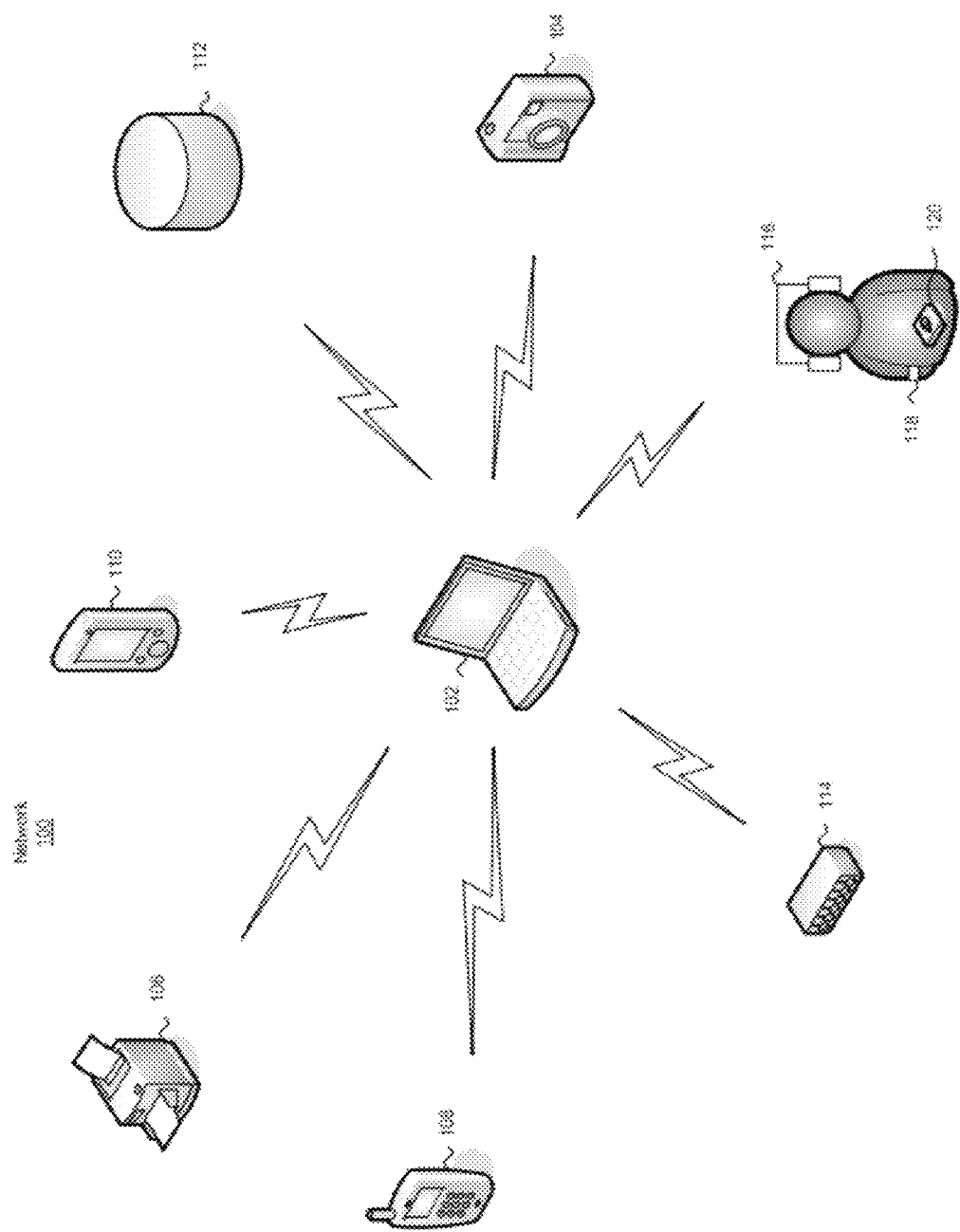
FIG. 1 is a conceptual block diagram illustrating an example of a wireless network.

Various aspects of apparatuses and methods will now be presented with reference to a wireless communications system. The wireless communications system includes multiple networks operating in close vicinity to one another and sharing the same spectrum. The shared spectrum can be licensed on unlicensed. As an example of unlicensed spectrum sharing, two different technologies utilizing the same UWB spectra could be operating at the same time. An example of licensed spectrum sharing, a wireless operator may choose to deploy two different wireless network technologies in the same spectrum. As an illustration, one wireless network technology could be a long range WWAN technology such as LTE, whereas a second wireless network technology could be a medium or short range peer-to-peer (p2p) wireless communication technology. Such a combination of technologies (long range and short range sharing the spectrum) is also applicable to unlicensed spectra such as TV-whitespaces. Alternatively, multiple long range and/or medium range and/or short range networks may share the same spectrum. A device that participates in two wireless networks sharing a common or overlapping spectrum may be used to suppress transmission in a first network to enable transmission in a second network. Subsequently, after the utilization of the shared wireless medium by the second network, the first network can resume transmission into the medium. The device may transmit a message to allow resumption of transmission in the first network. In some wireless configurations, such suppression of transmission in a first network can be done directionally, to allow either directional or omnidirectional transmission in a second network. In other wireless configurations, such suppression of transmission in a first network can be done omnidirectionally, to allow either directional or omnidirectional transmission in a second network. It should be noted that the term directional transmission is used for transmission that is not omnidirectional. Omnidirectional transmission refers to transmission that includes an angular transmission scope of 360 degrees or $2\pi$ radians in a 2d-plane centered around a transmitter, or $4\pi$ steradians in a 3d-plane centered around a transmitter. Directional transmission refers to an angular transmission scope that includes an angle $<2\pi$ centered around a transmitter, or a 3d solid angle $<4\pi$ centered around the transmitter. An example of a network capable of operating within this wireless communications system will be presented with reference to FIG. 1. In this example, the network 102 may be a WPAN employing UWB technology. As discussed earlier, UWB is a technology for providing high speed communications over a wide bandwidth. Because UWB signals are transmitted in very short pulses that consume very little power, this technology is well suited for WPAN applications. However, as those skilled in the art will readily appreciate, the various aspects presented throughout this disclosure may be extended to a broad array of networks and communication protocols. By way of example, the techniques described throughout this disclosure may be extended to one or more other networks using unlicensed spectrums such as Bluetooth, or WLAN. The techniques can also be applied to other licensed bands such as those associated with WWANs, or emerging available bands such as TV-whitespace bands. Alternatively, or in addition to, the one or more networks may employ CDMA technology to implement CDMA 2000, LTE technology, Universal Terrestrial Radio Access (UTRA), Time Division Multiple Access (TDMA) to implement GSM, Orthogonal Frequency Division Multiple Access (OFDMA) to implement Evolved UTRA (E-UTRA), Ultra Mobile Broadband (UMB), IEEE 802.11 (Wi-Fi), IEEE 802.16 (WiMAX), IEEE 802.20, Flash-OFDM, or any other radio technology and/or communications protocol which might be susceptible to interference from another network. Accordingly, any reference to a WPAN employing UWB technology is intended only to illustrate various aspects of apparatuses and methods, with the understanding that such aspects have a wide range of applications.

The network 100 is shown with various apparatuses distributed throughout a user's personal area. In this example, a computer 102 may receive digital photos from a digital camera 104, send documents to a printer 106 for printing, synch-up with e-mail on a personal digital assistant (PDA) 108, transfer music files to a digital audio player (e.g., MP3 player) 110, back up data and files to a mobile storage device 112, and communicate with a remote network (e.g., the Internet) via a wireless hub 114. The network 100 may also include a number of mobile and compact apparatuses, either wearable or implanted into the human body. By way of example, a person may be wearing a headset 116 (e.g., headphones) that transmits audio from a transducer to the computer 102, a watch 118 that transmits time or other information from a user interface to the computer 102, and/or a sensor 120 which monitors vital body parameters (e.g., a biometric sensor, a heart rate monitor, a pedometer, and EKG device, etc.). The sensor 120 transmits information from the body of the person to the computer 102 where the information may be forwarded to a medical facility (e.g., hospital, clinic, etc) via the wireless hub 114.

An apparatus will be referred to herein as a "wireless device," but may also be referred to by those skilled in the art as a handset, subscriber unit, subscriber station, mobile station, mobile subscriber station, mobile unit, mobile radio, radio telephone, wireless modem, remote station, remote terminal, access terminal, user terminal, terminal, wireless communication device, user device, user equipment (UE), node, an access point, a base station, a NodeB, and eNodeB, or any other suitable terminology that describes a wireless device capable of supporting a communications protocol. The various concepts described throughout this disclosure are intended to apply to all suitable apparatuses regardless of their specific nomenclature.

The various concepts presented throughout this disclosure may be used to reduce interference experienced by the network 100 from other wireless networks operating in close proximity and sharing the same spectrum. These concepts, however, may be extended to other communication environments by those skilled in the art. By way of example, these concepts may be applied to licensed bands such as those associated with WWANs, or emerging available bands such as TV-whitespace bands. In TV-whitespace bands and emerging networks operating in such bands, multiple air-interface protocols may be concurrently transmitting in the same frequency band. Some of these deployments may include a macro network with a large coverage region and a lower power micro (or pico) network which share the same spectrum. Alternatively, the pico network may comprise wireless devices that are incapable of communicating with each other due to interference in the macro network, so that it is desirable to suppress transmission in the macro network to enable wireless devices in the pico network to transmit. If a master wireless device has the ability to participate in both, then it can alert other wireless devices in the macro network to suppress their transmissions for a time-interval and allow wireless devices in the pico network to proceed with transmissions during that time-interval. This may be achieved in a variety of ways. By way of example, the master wireless device may transmit a message in the macro network to suppress transmissions in the macro network for a specified time interval. The master wireless device can also send a message to the pico network allowing wireless devices in the pico network to transmit during the time interval. Subsequently, following the time interval, the master wireless device can transmit a message in the pico network to suppress transmission in the pico network and send a message in the macro network to enable transmission of messages in the macro network. Such suppression of transmission in a macro network can be done in a directional manner as well. Directional suppression is useful if the wireless devices in the pico network all lie within a directional area relative to the master wireless device's association in a macro network. The master wireless device may have a priori knowledge of wireless devices intending to transmit in the pico network, so that it can selectively suppress transmission directionally in the appropriate direction in the macro network. The master wireless device may also have a priori knowledge of an exact or approximate location of the wireless devices intending to transmit in the pico network. Directional transmission may be performed in a sector or an angular region associated with the master wireless device. A directional transmission may be achieved with a directional antenna, an array of antennas using beam forming techniques, or by any other suitable means. An appropriate transmit power may also be chosen to transmit the message sufficient to reach the wireless devices in the macro network that need to be aware of an impending future transmission in the pico network.

In some wireless configurations, directional suppression may be enabled in a first network (with larger range for example), to allow for either omnidirectional transmission or directional transmission in a second network (with smaller range for example). In other wireless configurations, omnidirectional suppression may be enabled in a first network (with smaller range for example), to allow either omnidirectional transmission or directional transmission in a second network (with larger range for example).

In some wireless configurations, suppression of transmission in a wireless network in a directional manner can be enabled using a suitably designed Medium Access Control (MAC) layer. The nodes in the first and second wireless networks that support directional transmission exchange information about their relative angular regions. In one embodiment, the capability of supporting directional transmission and reception can be conveyed in one or more new Information Elements in the beacon frame or other MAC frame.

Figure 2:
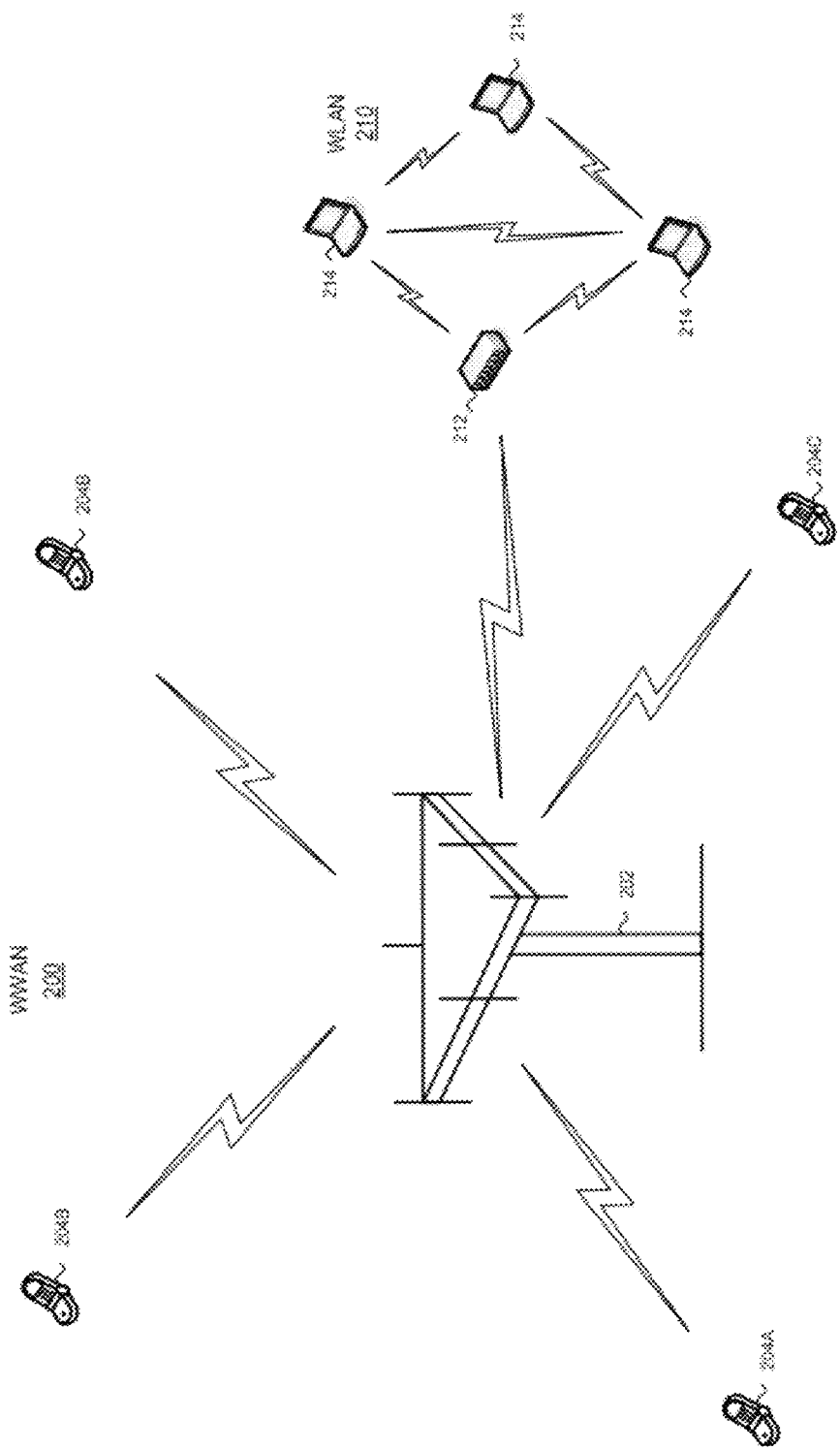
FIG. 2 is a conceptual block diagram illustrating another example of a wireless network.

Several aspects of a wireless communications system will now be presented with reference to FIG. 2. The wireless communications system is shown with a WWAN 200 with several wireless devices 204 in communication with a base station 202. The wireless devices 204 are shown as are cellular phones, but may be cordless phones, smart phones, session initiation protocol (SIP) phones, laptops, personal digital assistants (PDAs), satellite radios, global positioning systems, multimedia devices, video devices, digital audio players (e.g., MP3 player), cameras, game consoles, or any other suitable device having wireless connection capability. The base station 202 may be configured to support any suitable wireless access protocol. By way of example, the base station 202 may support GSM, UMTS, LTE, CDMA, or any other suitable wireless access protocol. The actual wireless access protocol employed by the base station 202 for any particular communications system will depend on the specific application and the overall design constraints imposed on the system. The various concepts presented throughout this disclosure are intended to apply to all suitable wireless communication systems regardless of the wireless access protocol supported by such systems.

The base station 202 includes several transceivers (not shown) which allows it to serve multiple sections of a cellular region with different antennas, or different arrangement of antenna elements. With this configuration, the base station 202 can form a directional beam to cover each sector of a cell. In this example, the base station 202 is configured to serve three sectors with each arrangement of antenna elements providing a 120° of coverage. To illustrate this concept, the base station 202 is shown in communication with a wireless device 204A in a first sector, two wireless devices 204B in a second sector, and a wireless device 204C in a third sector.

The wireless communications system is also shown with a WLAN 210 operating within a sector of the WWAN 210. The WLAN is shown as a peer-to-peer network comprising a number of computers 214 capable of communicating with a remote network (e.g., the Internet) over the WWAN 200 via a wireless hub 212. The WLAN 210 may be configured to support any suitable wireless access protocol including, by way of example, UWB, Bluetooth, IEEE 802.11, or the like. In this example, the WLAN 210 shares the same spectrum with the WWAN 200, and therefore, it may be desirable to suppress transmission in the third sector of the WWAN 200 to enable the wireless devices in the WLAN 210 to transmit with less interference. Since the base station 202 has the ability to participate in both networks, it can alert the wireless device 204C in the WWAN 200 to suppress its transmission for a time-interval and allow the wireless devices 212, 214 in the WLAN 210 to proceed with transmissions during that time-interval. This may be achieved in a variety of ways. By way of example, the base station 202 may directionally transmit a message into the third sector of the WWAN 200 to suppress transmission of the wireless device 204C. The base station 202 can also send a message to the wireless hub 212 in the WLAN 210 allowing the wireless devices 212, 214 in the WLAN 210 to transmit during the time interval. Subsequently, following the time interval, the base station 202 can transmit a message to the wireless hub 212 in the WLAN 210 to suppress transmission in the WLAN 210 and send a message in the third sector of the WWAN 200 to enable transmission by the wireless device 204C.

Figure 3:
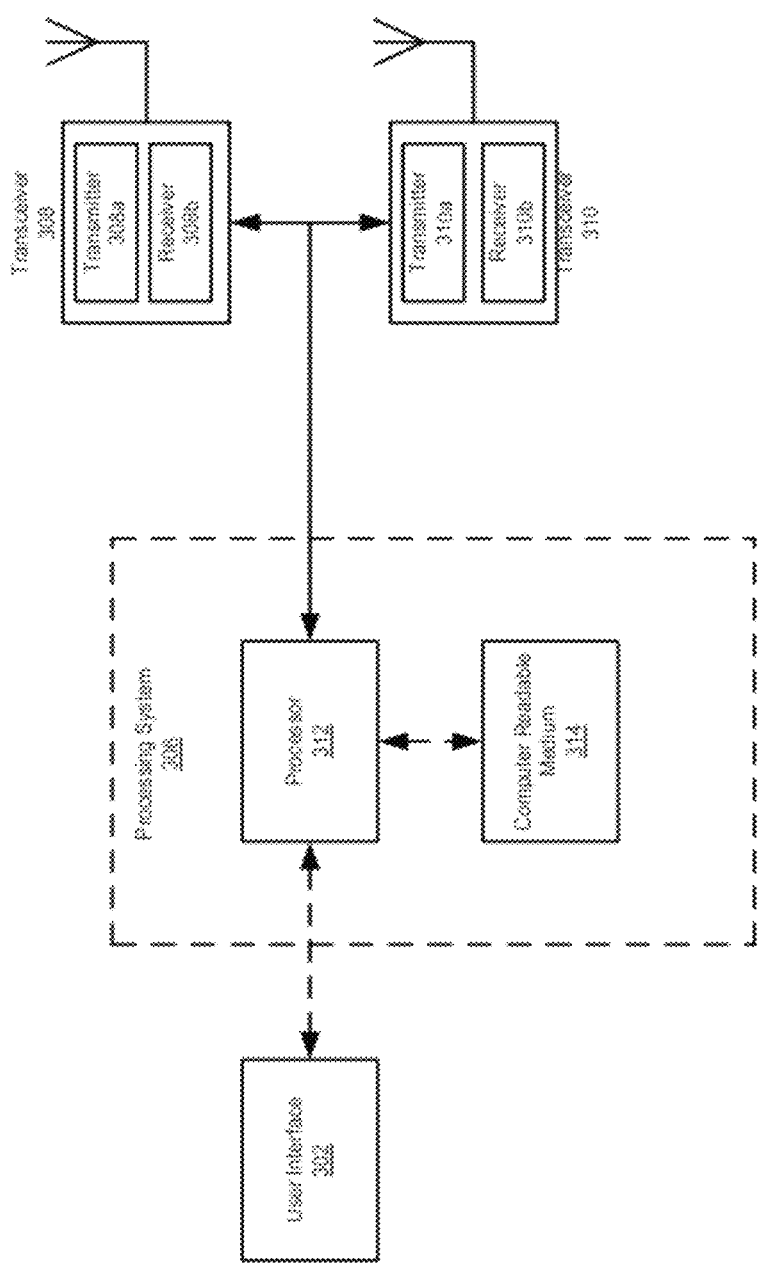
FIG. 3 is a conceptual block diagram illustrating an example of a wireless device for use in a wireless network.

FIG. 3 is a conceptual illustrating an example of a hardware configuration for a wireless device 304. In this example, the wireless device 304 is shown with a user interface 302 (e.g., a keypad, display, speaker, microphone, joystick, and/or any other combination user interface devices), a processing system 306, and multiple transceivers 308, 310, although each wireless device 304 may include any number of transceivers. The processing system 306 may have one or more processors represented generally by processor 312 and a computer readable medium (e.g., memory) 314.

The processor system 306 may be implemented using software, hardware, or a combination of both. By way of example, the processor 312 may be implemented with one or more, or any combination of, microprocessors, digital signal processors (DSP), application specific integrated circuits (ASIC), microcontrollers, field programmable gate arrays (FPGA) or other programmable logic, state machines, discrete gates, transistor logic, discrete hardware components, or some other processing entity designed to perform the various functions presented throughout this disclosure. Those skilled in the art will recognize how best to implement the described functionality for the processing system 304 depending on the particular application and the overall design constraints imposed on the overall system.

Software shall be construed broadly to mean instructions, data, or any combination thereof, whether referred to as software, firmware, middleware, microcode, hardware description language, or otherwise. Computer readable medium may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The computer readable may be embodied in a computer product. The computer product may comprise packaging materials.

In the conceptual illustration presented in FIG. 3, the computer readable medium 310 is shown as part of the processing system 306 separate from the processor 312. However, as those skilled in the art will readily appreciate, the computer readable medium 314, or any portion thereof, may be external to the processing system 306. By way of example, the computer readable medium 314 may include a transmission line, a carrier wave modulated by data, and/or a computer product separate from the wireless device 304, all which may be accessed by the processor 312 through an interface (not shown). Alternatively, or in addition to, the computer readable medium 314, or any portion thereof, may be integrated into the processor 312, such as the case may be with cache and/or general register files.

Each transceiver 308, 310 may provide a transmitting and/ or a receiving function. The transmitting function may be implemented with a transmitter (308a, 310a) that modulates a carrier with data for transmission over the wireless medium and the receiving function may be implemented with a receiver (308b, 310b) that demodulates a carrier received over the wireless medium to recover data. Each transceiver 308, 310 may also provide various other functions, such as RF front-end processing, analog/digital conversion, timing and frequency estimation, channel estimation, modulation coding scheme (MCS), etc. In summary, each transceiver 308, 310 may be configured to provide the complete physical layer implementation for a particular air interface protocol. The implementation is well within the capabilities of one skilled in the art.

In this example, the two transceivers 308, 310 enable the wireless device 304 to participate in two networks with different physical layer and Media Access Control (MAC) protocols. The first transceiver 308 implements the physical layer protocol for the first network and the second transceiver 310 implements the physical layer protocol for the second network. The processing system 306 is configured to support the MAC protocol for multiple networks and switch between transceivers to allow the wireless device 304 to participate in both networks.

The processor 312 is provides general processing functions, including the execution of software stored on the computer readable medium 314. The software includes instructions that when executed by the processor 312 cause the processing system 306 to perform the various functions presented throughout this disclosure. In the most general terms, the processing system 306 is configured to implement all functionality above the physical layer, however, as those skilled in the art will appreciate, various functions above the physical layer may also be implemented in the transceivers 308, 310. Moreover, various physical layer functions described above as being implemented by the transceivers 308, 310 may be implemented by the processing system 304.

A wireless devices operating in a wireless network may utilize wireless access protocols to compete for the medium with other wireless devices. The wireless access protocol for any particular wireless network will depend on the particular application and the overall design constraints imposed on the system. For the purposes of explanation only, exemplary wireless access protocols will be presented. Those skilled in the art will be readily able to extend the concepts presented throughout this disclosure to other suitable wireless access protocols.

The wireless access protocol may be implemented by various components, modules, and/or elements in the wireless device. As used in this disclosure, the terms "components," "modules," and "elements" are intended to refer to either hardware, firmware, a combination of hardware and software, software, or software in execution. By way of, a component, module, or element may be a process, an object, an executable, a thread of execution, a program, an application, a routine, a subroutine, a block of code or instructions, or any other software executed by the processor 312 or by another processing device. In this example, these components, modules, and elements may reside in the computer readable medium 314 which represents a single storage device, multiple storage devices, or other media. By way of example, a component, module, or element may be loaded into RAM from a larger storage device prior to execution. During execution, the processor 312 may load the component, module, or element, or any portion thereof into cache to increase access speed. One or more cache lines may then be loaded into a general register file for execution by the processor 312. When referring to the functionality of a component, module, or element in software applications, it will be understood that such functionality may be implemented by the processor 312 when executing the component, module, or element, or any portion thereof.

Figure 4:
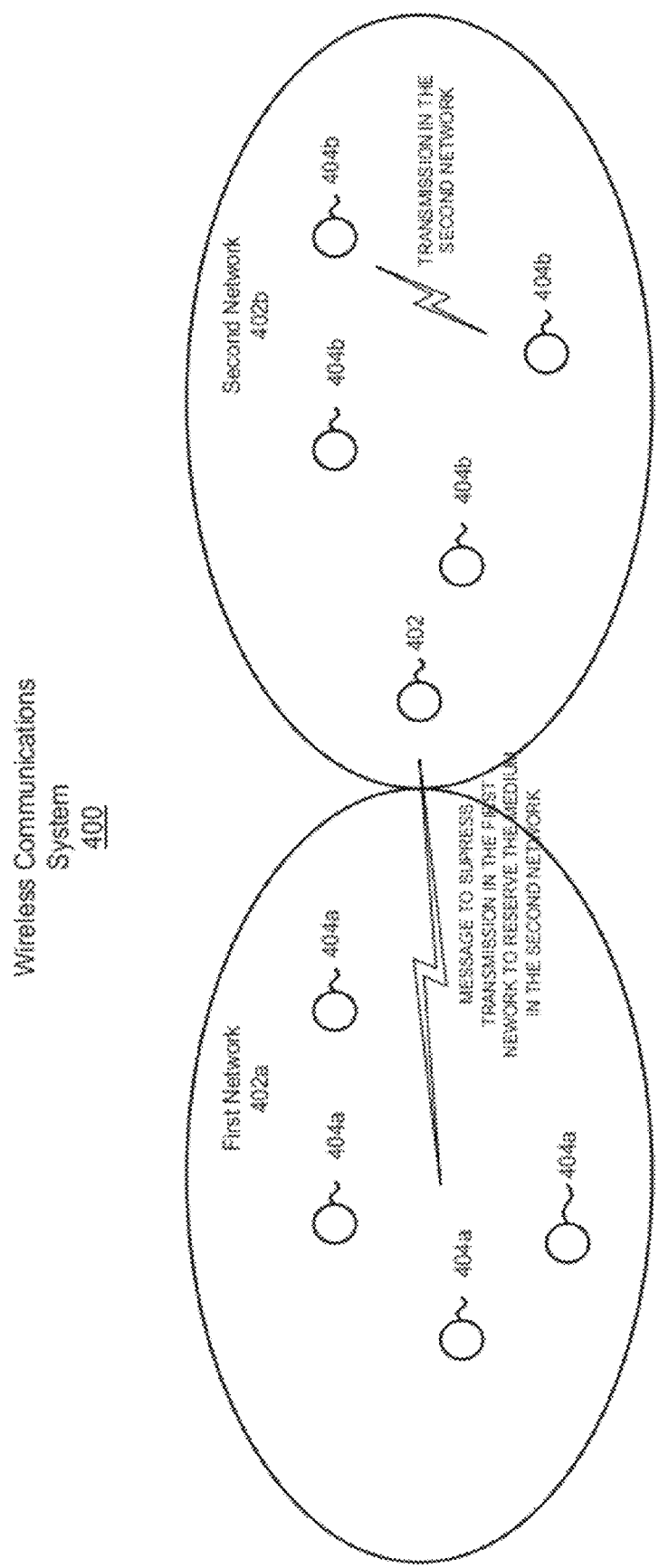
FIG. 4 is a conceptual block diagram illustrating an example of a wireless communications system.

Various components, modules, and elements to implement wireless access protocols will now be presented with reference to FIG. 4. FIG. 4 is a conceptual diagram illustrating an example of a wireless communications system. The wireless communications system 400 is shown with two networks 402a, 402b, but may be formed with any number of networks. In this example, the two networks 402a, 402b are in the same vicinity and share the same unlicensed spectrum. By way of example, the first wireless network 402a may be a UWB network with a specific protocol for the media access control and physical (MAC/PHY) layers and the second network 402b may be a UWB network with a different MAC/PHY protocol. However, as those skilled in the art will readily appreciate, the various aspects presented throughout this disclosure may be extended to a broad array of networks and communication protocols, many of which have already been identified earlier in this disclosure.

A wireless device 404 that has the ability to participate in both networks 402a, 402b may assist in coordinating transmissions in the two networks to reduce interference. By way of example, the wireless device 404 may reserve the medium for wireless transmissions between wireless devices 404b in the second network 402b by broadcasting a message into the first network 402a. The medium may be reserved for a time interval (T1) specified in the message or specified by some other means. During the time interval (T1), the wireless devices 404a in the first network 402a do not engage in wireless transmissions.

Following the time interval (T1), either immediately or some time later, the wireless device 404 may reserve the medium for wireless transmissions between wireless devices 404a in the first network 402a by broadcasting a message into the second network 402b. The medium may be reserved for a time interval (T2) specified in the message or specified by some other means. During the time interval (T2), the wireless devices 404b in the second network 402b do not engage in wireless transmissions.

The wireless device 404 may determine the sequencing of wireless transmissions between the two networks 402a, 402b based on any number of parameters, factors, and/or metrics. By way of example, the transmission sequencing may be determined based on a prediction of future requirements for transmission resources and/or current transmission resource requirements by each of the networks 402a, 402b. A constraint may be applied to the sequencing of wireless transmissions between the two networks 402a, 402b to ensure fairness. The transmission sequencing may periodic or non-periodic as a function of time.

In at least one configuration, a wireless device 404 may be configured to coordinate the transmissions between wireless devices in the first and second networks 402a, 402b when the medium is reserved for the wireless devices in one. In this configuration, the wireless device 404, after reserving the medium for wireless transmissions between wireless devices 404a in the first network 402a, schedules all such transmissions. Similarly, after reserving the medium for wireless transmissions between wireless devices 404b in the second network 402b, the wireless device 404 schedules all such transmissions. This may be achieved, by way of example, by broadcasting a transmission schedule on a control channel into the appropriate network. The transmission schedule may be determined by the wireless device 404 based on an exchange of control signals with the wireless devices. The wireless device 404 may also include a sleep schedule for the wireless devices in the broadcast.

The wireless device 404 described thus far is responsible for sequencing the wireless transmissions between the first and second wireless networks 402a, 402b. Alternatively, the wireless device 404 may cooperate with other wireless devices capable of participating in both networks to determine the sequencing. These wireless devices, which are dispersed at different locations throughout the communications system, can exchange information over a control channel and cooperate to optimize the sequencing of transmissions between the two networks 402a, 402b. Each of these wireless devices can provide a master function in a master/slave configuration by scheduling transmissions, either alone or in cooperation with other master devices, when the medium is reserved for slave devices in one of the networks.

Figure 5:
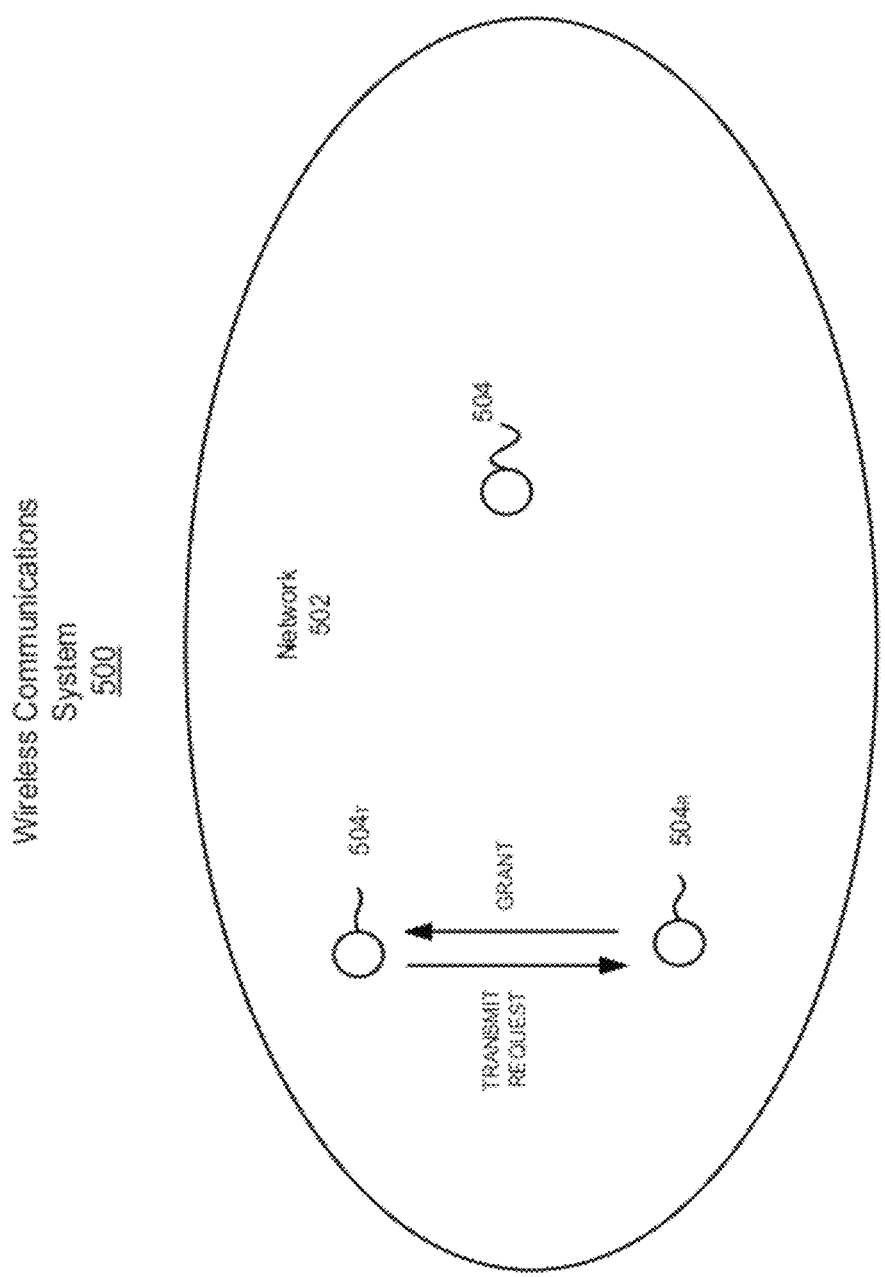
FIG. 5 is a conceptual block diagram illustrating an example of a wireless network in a wireless communications system.

The wireless access protocol for broadcasting the message to reserve the medium may vary depending on the particular application and the overall design constraints imposed on the overall system. For the purposes of illustration, an example of a wireless access protocol will be presented. This example builds on an underlying protocol that enables two wireless devices operating in the same network to communication. The underlying protocol will be presented with reference to FIG. 5. Turning to FIG. 5, a wireless device $504_T$ in a network 502 uses Carrier Sense Multiple Access (CSMA) to gain access to the medium to transmit to another wireless device $504_R$ in the same network 502. It does this by "sensing" the medium for activity from other wireless devices 504. If the transmitting wireless device $504_T$ detects activity, then it delays transmission. If the transmitting wireless device $504_T$ senses that the there is no activity, it attempts to reserve the medium by sending a transmit request to the receiving wireless device $504_R$. If the receiving wireless device $504_R$ is able to accept the transmission, it may respond to the transmission request with a grant, thereby reserving the medium for the transmitting wireless device $504_T$. The grant may also include a field indicating the time interval required to complete the transmission. This field in the grant is broadcast throughout the network 502. Wireless devices 504 in the vicinity of the receiving wireless device $504_R$ are able to hear the broadcast. As a result of this broadcast, these wireless devices 504 remain silent for the time interval in the field of the grant. This time interval will be referred to as a "silent period."

Returning to FIG. 4, the wireless device 404 may build on the underlying protocol described above to time sequence transmissions the two networks 402a, 402b. By way of example, the wireless device 404 may reserve the medium for wireless transmissions between wireless devices 404b in the second network 402b by broadcasting a grant into the first network 402a to a virtual device in the same network. As explained above, the wireless device 404 may set the field in the grant to reflect the time interval (T1) for the wireless devices 404a in the first network 402a to refrain from wireless transmissions. Depending on the protocol, the wireless devices 404a in the first network 402a may be aware that the wireless device 404 is reserving the medium for wireless device transmissions in the second network 402b, or alternatively, may assume that the wireless device 404 is about to receive a transmission from the virtual device. Either way, the wireless devices 404a defer any transmissions until after the time interval (T1) expires.

Depending on the nature of the transmission between the wireless devices 404b in the second network 402b, it is possible that the entire time interval (T1), or only some portion of it, is required. By way of example, the time interval (T1) may be set from a prediction of transmission resources required before reserving the medium as described earlier in this disclosure. Thus, it is possible that the actual transmission resources during the time interval (T1) may unexpectedly drop from that which was predicted. In that event, the wireless device 404 may release any additional time to the first wireless network 402b. The wireless device 404 may use a broadcast to release the medium to the wireless devices 404a in the first network 402a.

The underlying protocol may be used by the wireless device 404 to monitor the various transmission resource requirements of both networks 402a, 402b. More precisely, the wireless device 404 can monitor the grants, as well as the length of the silent periods in the grants, for the wireless devices. This information may then be used by the wireless device 404 to predict the future requirements for transmission resources. As described earlier in this disclosure, this prediction may then be used to time sequence the wireless transmissions between the two networks. The grants may also be monitored by the wireless device 404 to determine the current requirement for transmission resources and used, either alone or conjunction with a predictive algorithm, to determine the transmission time sequencing between the networks 402a, 402b. Alternatively, the time sequencing may be determined, whether based on a predictive algorithm or current utilization of transmission resources, by control signaling with the wireless devices in the two networks 402a, 402b, or from information learned from the network operator.

Figure 6:
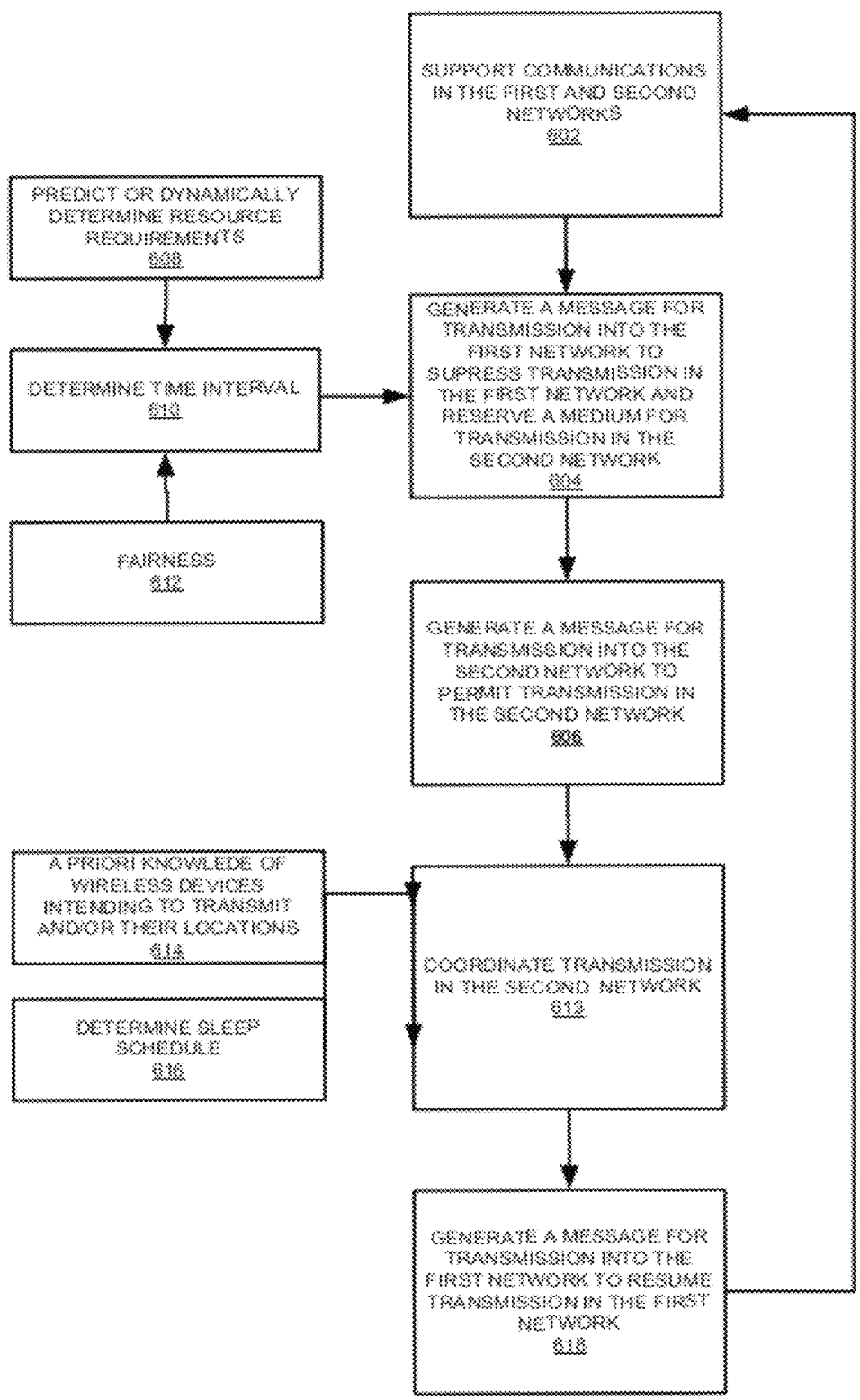
FIG. 6 is a flow diagram illustrating an example of the functionality of a processing system in a wireless device.

The operation of the processing system will now be presented with reference to FIG. 6. As described above, the processing system resides in a wireless device that may be able to communicate in two wireless networks. In step 602, the processing system supports communications with one or more wireless devices in the first and second wireless networks. In this example, the first and second wireless networks have a common spectrum and different air interface protocols. In step 604, a message is generated for transmission into the first wireless network to suppress transmission in the first network and reserve a medium for wireless transmission in the second wireless network.

The manner in which the message is transmitted into the first wireless network may vary depending upon the particular application and the overall design constraints imposed on the system. In one configuration of a wireless device, the transmitter is configured to directionally transmit the message into the first network. By way of example, the wireless device may be a base station serving a WWAN and the message may be transmitted into one of the sectors associated with the base station. Alternatively, the transmitter may be configured to directionally transmit the message into a region that covers the expected location of transmitting wireless devices in the second wireless network, or the expected range of future transmissions in the second network. The transmitter may transmit the message with sufficient power to reach wireless devices in the first wireless network that are within the range of transmissions in the second wireless network.

The medium may be reserved for transmissions in the second wireless network for a time interval. The time interval may be based on any suitable criteria. By way of example, resource requirements may be predicted or dynamically determined in step 608, and the time interval determined in step 610 based on those requirements. Alternatively, or in addition to, the time interval may be determined in step 612 based on criteria that ensure fairness to the first wireless network. In this example, the time interval may be included in the message generated in step 604, or may be broadcast by some other suitable means.

In step 606, a message is generated for transmission into the second network to permit transmission in the second network. The processing system may coordinate the transmissions in the second wireless network in step 613. Transmissions may be coordinated in step 614 using a priori knowledge of the wireless devices intending to transmit in the second wireless network and/or their locations. A sleep schedule may be determined in step 616 for one or more wireless devices in the second wireless network. Those skilled in the art will be readily able to determine the best way to coordinate transmissions in the second wireless network during the time interval based on the specific application and the overall design constraints imposed on the system.

In step 618, the processing system may generate a message following the time interval for transmission into the first network to resume transmission in the first network. Following transmission of this message, the processing system may begin supporting communications in both networks in step 602.

The various steps in the process disclosed is performed by a processing system in a wireless device, but may be performed by other suitable hardware, software, or any combination of the two operating in any suitable device. An example is provided where the processing system reside in a base station, however, the processing system may reside in an access point or any other device capable of providing access to another network for one or more other wireless devices. Alternatively, the processing system may reside in any wireless device capable of supporting a communications protocol including, by way of examples, a wireless device capable of peer-to-peer communications and/or accessing a network through a base station or similar device. It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

Figure 7:
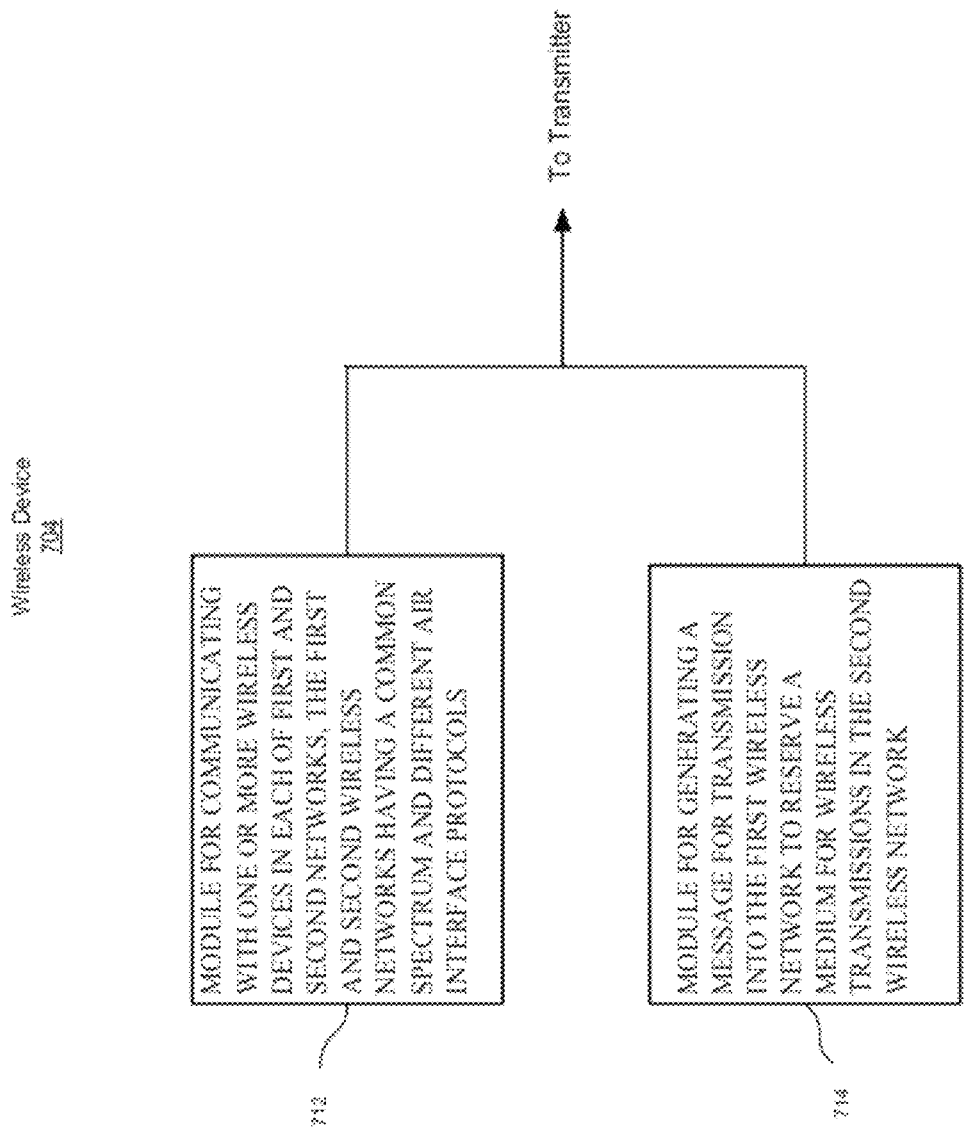
FIG. 7 is a conceptual block diagram illustrating an example of the functionality of a wireless device for use in a wireless network.

FIG. 7 is a block diagram illustrating an example of the functionality of a wireless device 704. In this example, the wireless device 704 includes a module 712 for communicating with one or more wireless devices in each of first and second networks, the first and second wireless networks having a common spectrum and different air interface protocols, and a module 714 for generating a message for transmission into the first wireless network to reserve a medium for wireless transmissions in the second wireless network.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
a processing system configured to:
support communications with one or more wireless devices in each of first and second wireless networks, the first and second wireless networks having a common spectrum, the first wireless network having a first air interface protocol and the second wireless network having a second air interface protocol, wherein the first air interface protocol is a different type of air interface protocol from the second air interface protocol; and
generate a message for transmission into the first wireless network to suppress transmission in the first wireless network, the transmission in the first wireless network using the common spectrum, and to reserve a medium for wireless transmissions in the second wireless network, the transmissions in the second wireless network using the common spectrum.

2. The apparatus of claim 1 further comprising a transmitter configured to transmit the message into the first wireless network.

3. The apparatus of claim 2 wherein the transmitter is further configured to directionally transmit the message into the first network.

4. The apparatus of claim 3 wherein the transmitter is further configured to directionally transmit the message into the first network to enable omnidirectional transmission in the second network.

5. The apparatus of claim 3 wherein the transmitter is further configured to directionally transmit the message into the first network to enable directional transmission in the second network.

6. The apparatus of claim 2 wherein the transmitter is further configured to omnidirectionally transmit the message into the first network to enable directional transmission in the second network.

7. The apparatus of claim 2 wherein the transmitter is further configured to omnidirectionally transmit the message into the first network to enable omnidirectional transmission in the second network.

8. The apparatus of claim 3 wherein the apparatus is a base station serving a wireless wide area network.

9. The apparatus of claim 8 wherein the transmitter is further configured to directionally transmit the message into one of a plurality of sectors associated with the base station.

10. The apparatus of claim 3 wherein the transmitter is further configured to directionally transmit the message into a region that covers the expected location of transmitting wireless devices in the second wireless network.

11. The apparatus of claim 3 wherein the transmitter is further configured to directionally transmit the message into a region that covers the expected range of future transmission in the second wireless network.

12. The apparatus of claim 1 wherein the transmitter is further configured to transmit the message with a power sufficient to reach wireless devices in the first wireless network that are within range of transmissions in the second wireless network.

13. The apparatus of claim 1 wherein the processing system is further configured to generate the message for transmission into the first wireless network to reserve the medium for a time interval.

14. The apparatus of claim 13 wherein the processing system is further configured to predict resource requirements in at least one of the first and second wireless networks and determine the time interval to reserve the medium based, at least in part, on said prediction.

15. The apparatus of claim 13 wherein the processing system is further configured to dynamically determine resource requirements in at least one of the first and second networks and determine the time interval to reserve the medium based, at least in part, on said determination.

16. The apparatus of claim 13 wherein the processing system is further configured to determine the time interval to reserve the medium based, at least in part, on a criterion to ensure fairness in the first wireless network.

17. The apparatus of claim 13 wherein the processing system is further configured to coordinate wireless transmissions in the first wireless network following the time interval.

18. The apparatus of claim 17 wherein the processing system is further configured to determine a sleep schedule for one or more wireless devices in the first wireless network following the time interval.

19. The apparatus of claim 13 wherein the processing system is further configured to generate a message for transmission into the second wireless network to reserve the medium for wireless transmissions in the first wireless network following the time interval of the reserved medium for wireless transmissions in the second wireless network.

20. The apparatus of claim 1 wherein the processing system is further configured to coordinate the wireless transmissions in the second wireless network while the medium is reserved.

21. The apparatus of claim 20 wherein the processing system is further configured to determine a sleep schedule for one or more wireless devices in the second wireless network while the medium is reserved.

22. The apparatus of claim 1 wherein the processing system is further configured to store information relating to the wireless devices intending to transmit in the second wireless network.

23. The apparatus of claim 1 wherein the processing system is further configured to store information relating to the location of the wireless devices intending to transmit in the second wireless network.

24. The apparatus of claim 1 wherein the apparatus is an access point for a wireless local area network.

25. The apparatus of claim 1 wherein the processing system is configured to support of peer-to-peer transmission.

26. The apparatus of claim 1 wherein the processing system is further configured to generate a message for transmission into the second wireless network to permit wireless devices in the second wireless network to transmit.

27. A method of wireless communications, comprising:
supporting communications with one or more wireless devices in each of first and second wireless networks, the first and second wireless networks having a common spectrum, the first wireless network having a first air interface protocol and the second wireless network having a second air interface protocol, wherein the first air interface protocol is a different type of air interface protocol from the second air interface protocol; and
generating a message for transmission into the first wireless network to suppress transmission in the first wireless network, the transmission in the first wireless network using the common spectrum, and to reserve a medium for wireless transmissions in the second wireless network, the transmissions in the second wireless network using the common spectrum.

28. The method of claim 27 further comprising transmitting the message into the first wireless network.

29. The method of claim 28 wherein the message is directionally transmitted into the first network.

30. The method of claim 29 wherein the message is directionally transmitted into the first network to enable omnidirectional transmission in the second network.

31. The method of claim 29 wherein the message is directionally transmitted into the first network to enable directional transmission in the second network.

32. The method of claim 28 wherein the message is omnidirectionally transmitted into the first network to enable directional transmission in the second network.

33. The method of claim 28 wherein the message is omnidirectionally transmitted into the first network to enable omnidirectional transmission in the second network.

34. The method of claim 29 wherein the message is transmitted from a base station serving a wireless wide area network.

35. The method of claim 34 wherein the message is directionally transmitted into one of a plurality of sectors associated with the base station.

36. The method of claim 29 wherein the message is directionally transmitted into a region that covers the expected location of transmitting wireless devices in the second wireless network.

37. The method of claim 29 wherein the message is directionally transmitted into a region that covers the expected range of future transmission in the second wireless network.

38. The method of claim 27 wherein the message is transmitted with a power sufficient to reach wireless devices in the first wireless network that are within range of transmissions in the second wireless network.

39. The method of claim 27 wherein the message is generated for transmission into the first wireless network to reserve the medium for a time interval.

40. The method of claim 39 further comprising predicting resource requirements in at least one of the first and second wireless networks and determining the time interval to reserve the medium based, at least in part, on said prediction.

41. The method of claim 39 further comprising dynamically determining resource requirements in at least one of the first and second networks and determine the time interval to reserve the medium based, at least in part, on said determination.

42. The method of claim 39 further comprising determining the time interval to reserve the medium based, at least in part, on a criterion to ensure fairness in the first wireless network.

43. The method of claim 39 further comprising coordinating wireless transmissions in the first wireless network following the time interval.

44. The method of claim 43 further comprising determining a sleep schedule for one or more wireless devices in the first wireless network following the time interval.

45. The method of claim 39 further comprising generating a message for transmission into the second wireless network to reserve the medium for wireless transmissions in the first wireless network following the time interval of the reserved medium for wireless transmissions in the second wireless network.

46. The method of claim 27 further comprising coordinating the wireless transmissions in the second wireless network while the medium is reserved.

47. The method of claim 46 further comprising determining a sleep schedule for one or more wireless devices in the second wireless network while the medium is reserved.

48. The method of claim 27 further comprising storing information relating to the wireless devices intending to transmit in the second wireless network.

49. The method of claim 27 further comprising storing information relating to the location of the wireless devices intending to transmit in the second wireless network.

50. The method of claim 27 wherein the message is generated by an access point for a wireless local area network.

51. The method of claim 27 further comprising supporting of peer-to-peer transmission.

52. The method of claim 27 further comprising generating a message for transmission into the second wireless network to permit wireless devices in the second wireless network to transmit.

53. An apparatus for wireless communications, comprising:
   means for supporting communications with one or more wireless devices in each of first and second wireless networks, the first and second wireless networks having a common spectrum, the first wireless network having a first air interface protocol and the second wireless network having a second air interface protocol, wherein the first air interface protocol is a different type of air interface protocol from the second air interface protocol; and
   means for generating a message for transmission into the first wireless network to suppress transmission in the first wireless network, the transmission in the first wireless network using the common spectrum, and to reserve a medium for wireless transmissions in the second wireless network, the transmissions in the second wireless network using the common spectrum.

54. The apparatus of claim 53 further comprising means for transmitting the message into the first wireless network.

55. The apparatus of claim 54 wherein the means for transmitting the message is configured to directionally transmit the message into the first network.

56. The apparatus of claim 55 wherein the means for transmitting the message is configured to directionally transmit the message into the first network to enable omnidirectional transmission in the second network.

57. The apparatus of claim 55 wherein the means for transmitting the message is configured to directionally transmit the message into the first network to enable directional transmission in the second network.

58. The apparatus of claim 54 wherein the means for transmitting the message is configured to omnidirectionally transmit the message into the first network to enable directional transmission in the second network.

59. The apparatus of claim 54 wherein the means for transmitting the message is configured to omnidirectionally transmit the message into the first network to enable omnidirectional transmission in the second network.

60. The apparatus of claim 55 wherein the apparatus is a base station serving a wireless wide area network.

61. The apparatus of claim 60 wherein the means for transmitting the message is configured to directionally transmit the message into one of a plurality of sectors associated with the base station.

62. The apparatus of claim 55 wherein the means for transmitting the message is configured to directionally transmit the message into a region that covers the expected location of transmitting wireless devices in the second wireless network.

63. The apparatus of claim 55 wherein the means for transmitting the message is configured to directionally transmit the message into a region that covers the expected range of future transmission in the second wireless network.

64. The apparatus of claim 53 wherein the means for transmitting the message is configured to transmit the message with a power sufficient to reach wireless devices in the first wireless network that are within range of transmissions in the second wireless network.

65. The apparatus of claim 53 wherein the means for generating the message is configured to generate the message for transmission into the first wireless network to reserve the medium for a time interval.

66. The apparatus of claim 65 further comprising means for predicting resource requirements in at least one of the first and second wireless networks and means for determining the time interval to reserve the medium based, at least in part, on said prediction.

67. The apparatus of claim 65 further comprising means for dynamically determining resource requirements in at least one of the first and second networks and means for determining the time interval to reserve the medium based, at least in part, on said determination.

68. The apparatus of claim 65 further comprising means for determining the time interval to reserve the medium based, at least in part, on a criterion to ensure fairness in the first wireless network.

69. The apparatus of claim 65 further comprising means for coordinating wireless transmissions in the first wireless network following the time interval.

70. The apparatus of claim 69 further comprising means for determining a sleep schedule for one or more wireless devices in the first wireless network following the time interval.

71. The apparatus of claim 65 further comprising means for generating a message for transmission into the second wireless network to reserve the medium for wireless transmissions in the first wireless network following the time interval of the reserved medium for wireless transmissions in the second wireless network.

72. The apparatus of claim 53 further comprising means for coordinating the wireless transmissions in the second wireless network while the medium is reserved.

73. The apparatus of claim 72 further comprising means for determining a sleep schedule for one or more wireless devices in the second wireless network while the medium is reserved.

74. The apparatus of claim 53 further comprising means for storing information relating to the wireless devices intending to transmit in the second wireless network.

75. The apparatus of claim 53 further comprising means for storing information relating to the location of the wireless devices intending to transmit in the second wireless network.

76. The apparatus of claim 53 wherein the apparatus is an access point for a wireless local area network.

77. The apparatus of claim 53 further comprising means for supporting of peer-to-peer transmission.

78. The apparatus of claim 53 further comprising means for generating a message for transmission into the second wireless network to permit wireless devices in the second wireless network to transmit.

79. A computer product, comprising:
a non-transitory computer-readable medium, comprising:
code for causing a computer to support communications with one or more wireless devices in each of first and second wireless networks, the first and second wireless networks having a common spectrum, the first wireless network having a first air interface protocol and the second wireless network having a second air interface protocol, wherein the first air interface protocol is a different type of air interface protocol from the second air interface protocol; and
code for causing a computer to generate a message for transmission into the first wireless network to suppress transmission in the first wireless network, the transmission in the first wireless network using the common spectrum, and to reserve a medium for wireless transmissions in the second wireless network, the transmissions in the second wireless network using the common spectrum.

80. The computer product of claim 79 wherein the code for causing a computer to generate a message is configured to generate the message for transmission into the first wireless network to reserve the medium for a time interval.

81. The computer product of claim 80 further comprising code for causing a computer to predict resource requirements in at least one of the first and second wireless networks and code for causing a computer to determine the time interval to reserve the medium based, at least in part, on said prediction.

82. The computer product of claim 80 further comprising code for causing a computer to dynamically determine resource requirements in at least one of the first and second networks and code for causing a computer to determine the time interval to reserve the medium based, at least in part, on said determination.

83. The computer product of claim 80 further comprising code for causing a computer to determine the time interval to reserve the medium based, at least in part, on a criterion to ensure fairness in the first wireless network.

84. The computer product of claim 80 further comprising code for causing a computer to coordinate wireless transmissions in the first wireless network following the time interval.

85. The computer product of claim 80 further comprising code for causing a computer to determine a sleep schedule for one or more wireless devices in the first wireless network following the time interval.

86. The computer product of claim 80 further comprising code for causing a computer to generate a message for transmission into the second wireless network to reserve the medium for wireless transmissions in the first wireless network following the time interval of the reserved medium for wireless transmissions in the second wireless network.

87. The computer product of claim 79 further comprising code for causing a computer to coordinate the wireless transmissions in the second wireless network while the medium is reserved.

88. The computer product of claim 87 further comprising code for causing a computer to determine a sleep schedule for one or more wireless devices in the second wireless network while the medium is reserved.

89. The computer product of claim 79 further comprising code for causing a computer to store information relating to the wireless devices intending to transmit in the second wireless network.

90. The computer product of claim 79 further comprising code for causing a computer to store information relating to the location of the wireless devices intending to transmit in the second wireless network.

91. The computer product of claim 79 further comprising code for causing a computer to support peer-to-peer transmission.

92. The computer product of claim 79 further comprising code for causing a computer to generate a message for transmission into the second wireless network to permit wireless devices in the second wireless network to transmit.

* * * * *